Feb. 24, 1970  G. H. CORK ETAL  3,496,802
GEARING SYSTEM
Filed May 1, 1968  4 Sheets-Sheet 3
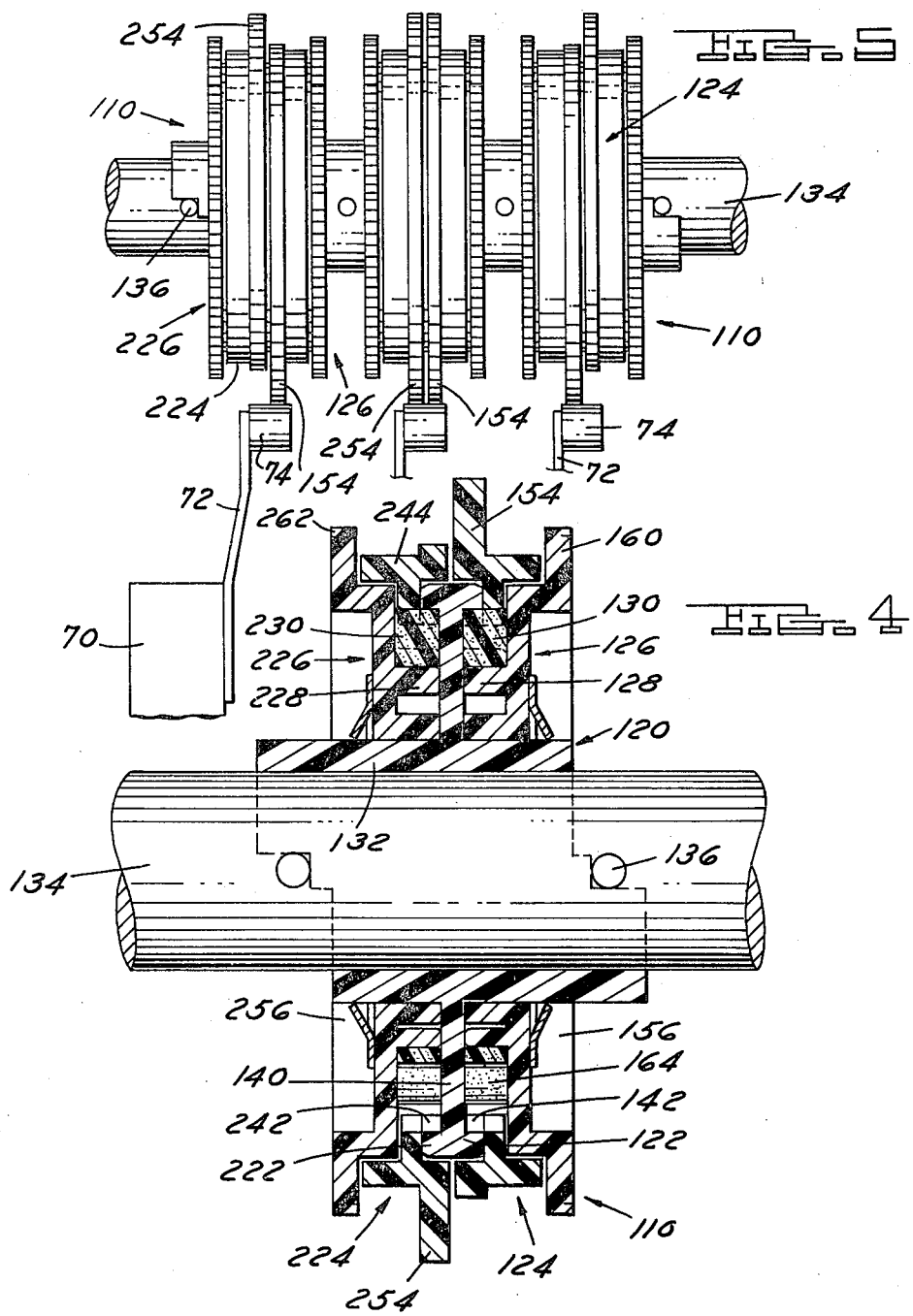
INVENTORS
GORDON H. CORK
BY JOHN E. ARNOLD
Burton & Parker
ATTORNEYS Feb. 24, 1970   G. H. CORK ETAL   3,496,802
GEARING SYSTEM
Filed May 1, 1968   4 Sheets-Sheet 4
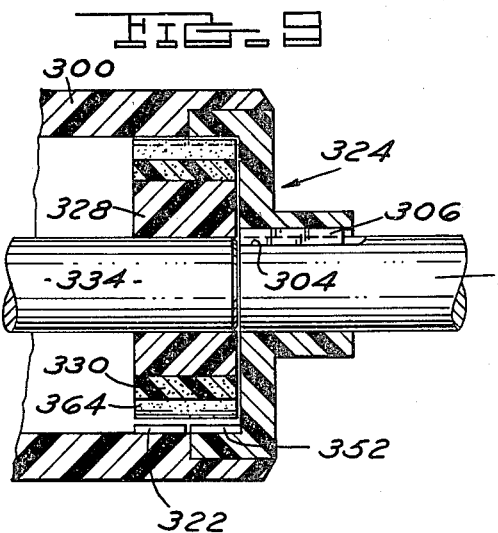
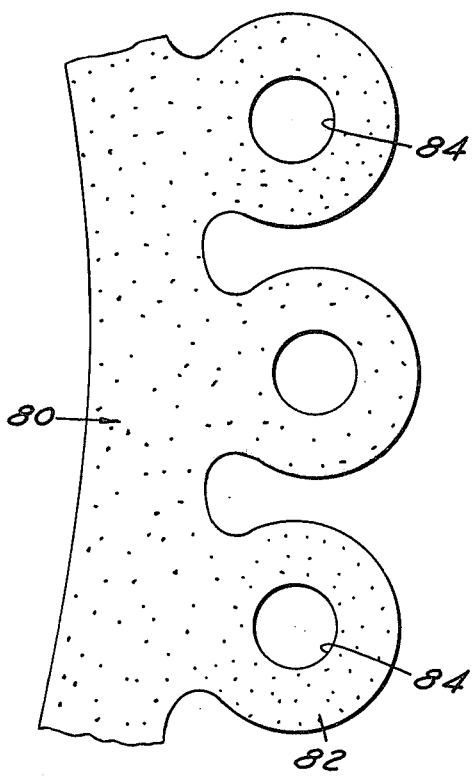
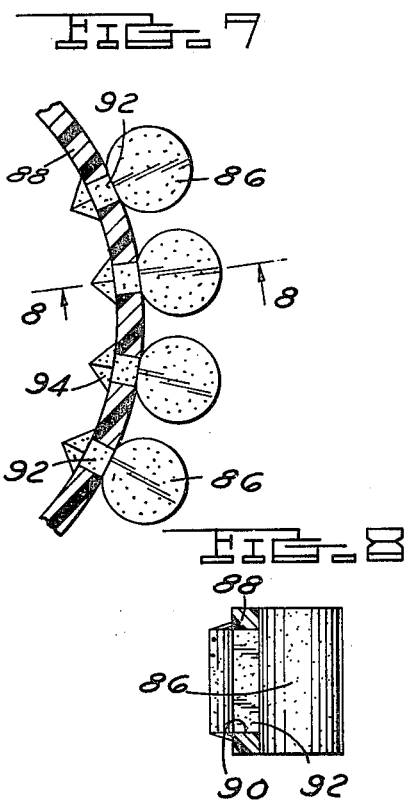
INVENTORS
GORDON H. CORK
BY JOHN E. ARNOLD
Burton & Parker
ATTORNEYS

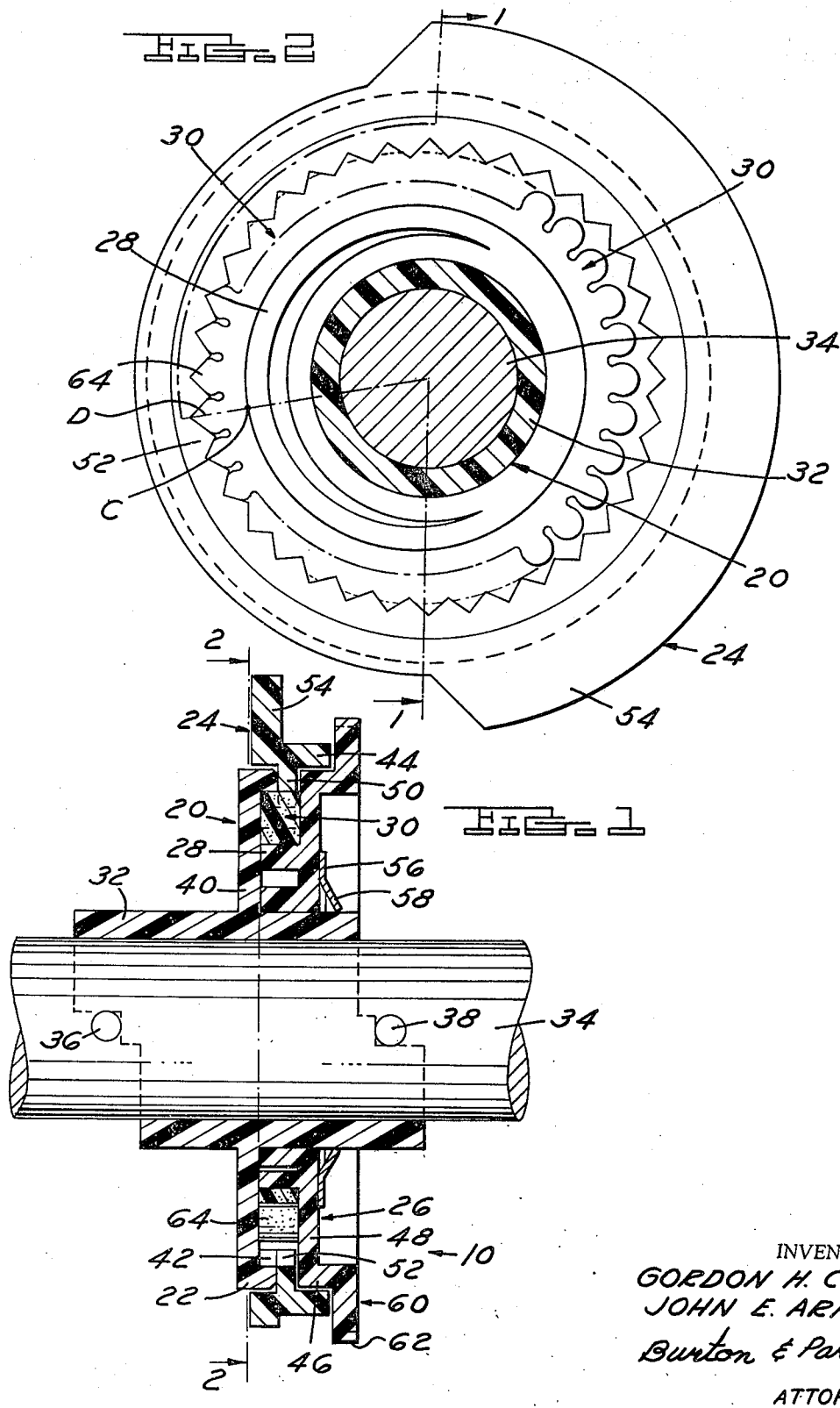

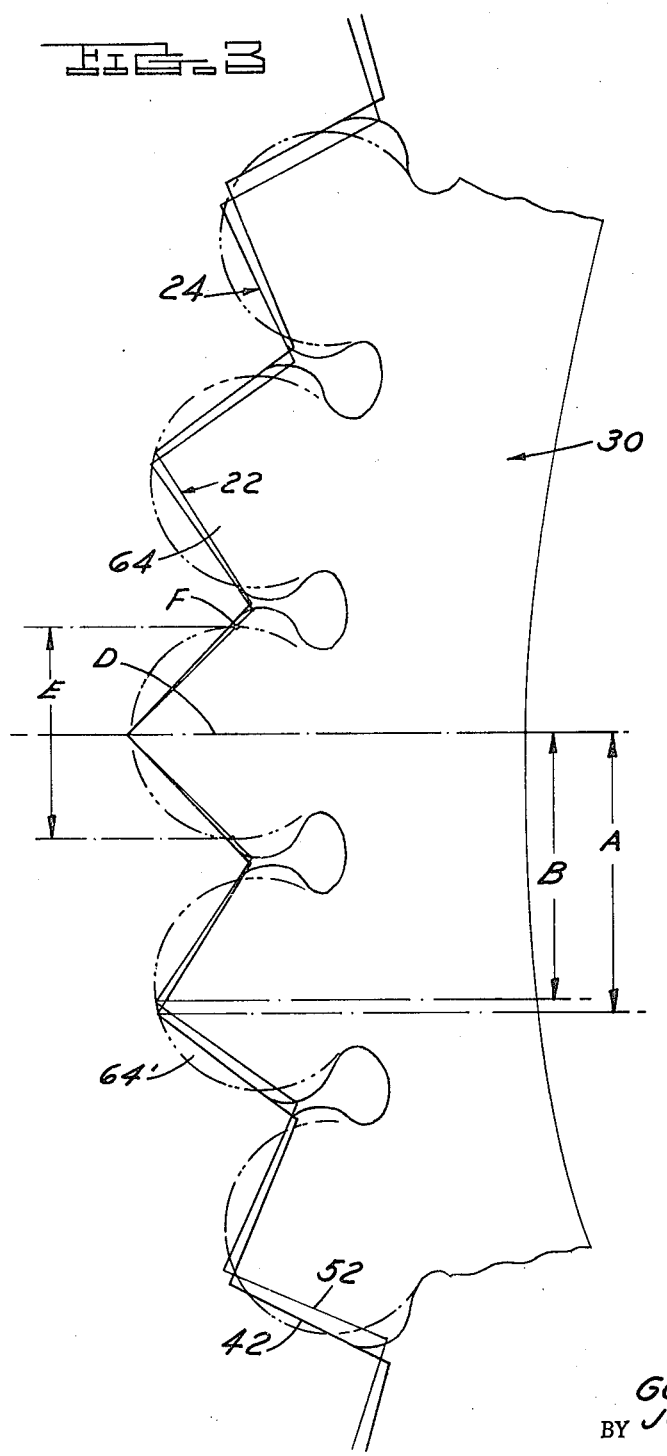

United States Patent Office

3,496,802
Patented Feb. 24, 1970

3,496,802
GEARING SYSTEM
Gordon H. Cork, Birmingham, and John E. Arnold, Clawson, Mich., assignors to Gemco Electric Company, Clawson, Mich., a corporation of Michigan
Filed May 1, 1968, Ser. No. 725,797
Int. Cl. F16h 55/18, 1/32
U.S. Cl. 74—805         27 Claims

ABSTRACT OF THE DISCLOSURE

A gearing system includes an internal ring gear meshing with a pinion gear having external teeth, and a gearing system includes two co-axial ring gears meshing with a pinion gear having one set of external teeth, wherein the teeth of one of the gears are resilient and have a tooth thickness greater than the width of the space between the teeth of the mating gears, causing the resilient teeth to be resiliently deformed and eliminate backlash. The disclosed embodiments include a rotary switching mechanism and a speed reducer.

FIELD OF THE INVENTION

This invention relates to a gearing system, and more particularly to a gearing system having a gear with resilient teeth of a tooth thickness greater than the space between the teeth of the mating gear.

DESCRIPTION OF THE PRIOR ART

The prior art includes gearing systems having a flexible gear intermeshing with a relatively rigid gear, such as shown by United States Letters Patent No. 2,906,143 and British patent publication No. 249,805; however the wall of the flexible gear in these patents is caused to resiliently deflect, and the teeth are substantially rigid. The tooth thickness of the flexible gear must therefore be slightly smaller than the space between the teeth of the opposed mating gear to prevent binding, resulting in a backlash condition. Backlash is defined as the difference between the space between the teeth of the first gear less the thickness of the teeth of the mating gear, measured at the pitch diameter. Or in other words, the difference between the tooth thickness of one gear and the width of the tooth space of the mating gear. The above referenced United States patent does state that backlash can be removed by "skewing" the gear train, however this is not a satisfactory solution in many applications.

The prior art also includes a number of planetary gearing systems which include one or more plastic or resin gears, such as shown by the United States Patents 2,828,649, 2,991,665, and 3,080,953. The teeth of the plastic gears shown by these patents do not however resiliently deform to prevent backlash, and are generally formed of relatively "rigid" plastic or resin materials, such as polymerized formaldehyde acetal resin, or nylon, or the intermeshing gears are formed of the same plastic material.

The following United States patents are cited as examples of planetary or epicycloid gearing systems having one pinion gear meshing with two ring gears: 1,435,181; 2,404,116; 2,667,076; 3,045,503. It should be noted that where a single pinion gear is adapted to intermesh with two ring gears having different numbers of teeth, as shown by the prior art, and the gear teeth are relatively rigid, the teeth of the pinion gear must be substantially smaller in thickness than the teeth of the ring gear having the lesser number of teeth, resulting in a severe backlash condition; or the pinion gear must be divided to provide two sets of gear teeth, resulting in additional expense. This problem is obviated by the use of resilient teeth on one of the gears, as explained hereinbelow.

SUMMARY OF THE INVENTION

The gearing system of the invention includes a first gear having internal teeth, and a second gear received within the first gear having external teeth meshing with the teeth of the first gear at least one point. The teeth of one of the gears are resilient, and have a tooth thickness greater than the width of the space between the teeth of the opposite gear at corresponding diameters, preferably the pitch diameter of the gears. The resilient teeth are thus resiliently deformed in the space between the teeth of the opposite gear at the point of intermeshing between the gears; thereby eliminating backlash. The resilient teeth may each be provided with an aperture to provide a relief for the resilient deformation at the point of intermeshing between the gears.

In one embodiment of the invention disclosed herein, the second gear or pinion gear is formed of a resilient material; thus eliminating the need of separately formed resilient teeth. We have however also disclosed a substantially rigid pinion gear having separate resilient teeth, which may be preferred in some applications. It is, however, preferable to provide resilient engagement between a plurality of teeth to insure self-locking between the gears. We have found that a generally circular cross section resilient tooth configuration will insure self-locking, and prevent backlash.

The gearing system of this invention may also include two substantially co-axial ring gears, as described hereinbelow, which intermesh with a single pinion gear. In the preferred embodiment, the ring gears have a different number of internal teeth, imparting a rotary motion to one of the ring gears. The resiliency of the teeth in this embodiment is particularly important because it permits the gear teeth to be resiliently deformed to provide full flank engagement and prevent backlash. It will be understood that the teeth of either the ring gears or the teeth of the pinion gear may be resilient, however in the disclosed embodiment the pinion gear is provided with resilient teeth. In this embodiment, the pinion gear teeth are resiliently deformed to substantially fill the space between the teeth of both ring gears, which is not possible where the teeth are substantially rigid.

In the embodiment of the adjustable rotary switch of this invention, the gearing system includes a cam means received within the pinion gear, which biases the resilient teeth of the pinion gear into the teeth of the first gear or ring gear. The camming means may be a rotatable circular cam eccentrically mounted relative to the ring gear. The pinion gear may be formed of a resilient deformable material, in which case the pinion gear is preferably stretched over the circular camming means to prevent deflection of the wall of the pinion gear at the point of intermeshing between the gears. It should be noted that resilient deflection is a desirable attribute in a strain wave gearing system, such as shown by United States Patent 2,906,143, however such deflection causes slippage in an epicycloid gearing system, and is therefore to be avoided in this embodiment. The orbital or epicycloid gearing system of my invention thus permits resilient deformation of the teeth of the pinion gear to prevent backlash, without permitting deflection of the wall of the gears which would result in slippage between the pinion gear and the internal cam means.

The adjustable rotary switch mechanism embodiment of this invention includes a hub adapted to be mounted in fixed relation on a shaft, a first ring gear having internal teeth fixed relative to the hub, a second rotatable ring gear having internal teeth substantially co-axial with the teeth of the first ring gear, and an eccentrically mounted pinion gear having external teeth intermeshing with the teeth of the ring gear at at least one point. In the disclosed embodiment, the ring gears have a different number of teeth, and the first ring gear is stationary with respect to the shaft, causing the second ring gear to rotate relative to the first. An external cam is provided on the rotatable ring gear, which is adapted to engage a switching mechanism. A rotatable eccentric cam means, such as described hereinabove, is received within the pinion gear to bias the teeth of the pinion gear into the teeth of the ring gear. In the preferred embodiment of the rotary switch of the invention, the teeth of the pinion gear are resilient, and have a tooth thickness greater than the width of the space between the teeth of the ring gears; such that the resilient teeth of the pinion gear are resiliently deformed in the ring gears to prevent backlash, as described above.

In one embodiment of the adjustable rotary switch of this invention, the first ring gear includes a second set of internal teeth; the switching mechanism includes a third ring gear having internal teeth, a second pinion gear having external teeth meshing with the teeth of the third ring gear and the second set of teeth of the first ring gear, and a second eccentric camming means, as described above. The third ring gear also has an independently adjustable external cam adapted to engage the aforesaid switching mechanism. The external cams may thus be adjusted, relative to one another, to adjust the dwell of the switching mechanism.

Adjustable rotary switching mechanisms of the type disclosed herein have particular utility in controlling machines having a repetitive cycle of operation, such as punch presses, printing presses, material handling mechanisms, etc. A series of cam units are generally secured to a rotating shaft to actuate a contact switch, or the like, in a timing mechanism. The position of the cam units relative to the shaft must therefore be adjustable to permit changes in the timing of the machine. A commercially successful adjustable rotary switch mechanism has been previously disclosed in the United States Letters Patent No. 3,120,595, which may be adjusted while the shaft is in motion. This device has been highly successful, however it is too expensive for some applications. The cam switch of this invention is intended to provide an easily adjustable rotary switching mechanism which eliminates backlash, and makes the gears self-locking, at the minimum of cost.

In the preferred embodiment of the rotary switching mechanism of the invention, the internal camming means which biases the pinion gear into meshing engagement with the ring gears has an integral hand manipulating means which permits adjustment of the position of the external cam simply by rotation of the manipulating means. The rotary switch of this invention is not intended to provide adjustment while the shaft is rotating, however it will be understood that the switching mechanism may be modified to permit such adjustment.

There is also disclosed herein a speed reducer utilizing the gearing system of this invention, wherein the first ring gear is provided on the inside of the housing, and the second ring gear is the output of the speed reducer, and thus may be connected to an output shaft. The eccentric cam means which biases the pinion gear into meshing engagement with the ring gears is fixed to the output shaft of the power source, to provide substantially the same relationship described above. In the preferred embodiment of the speed reducer of this invention, one of the gears is provided with resilient teeth, as described above, and the thickness of the resilient teeth are greater than the space between the teeth of the meshing gears.

It will be understood from the disclosure herein that either the ring gear or the pinion gear may be provided with resilient teeth as described above, and therefore the invention is not limited to a resilient pinion gear. It will also be understood that the gearing system of this invention is not limited to rotary switching mechanisms or speed reducers. Further, the broad concept of providing a gear having resilient teeth of a tooth thickness greater than the width of the tooth space in the mating gear is not limited to orbital or epicycloid gearing systems.

BRIEF DESCRIPTION OF THE DRAWINGS

FIGURE 1 is a partial cross sectional view of a rotary switching mechanism embodying the invention, in the direction of view arrows 1—1 in FIGURE 2;

FIGURE 2 is a cross sectional view of the switching mechanism shown in FIGURE 1, in the direction of view arrows 2—2;

FIGURE 3 is a partial cross sectional view of a portion of the gearing system of FIGURES 1 and 2;

FIGURE 4 is a cross sectional view of double rotary switching mechanism embodying the invention;

FIGURE 5 is a side elevation of an adjustable rotary switching mechanism;

FIGURE 6 is a partial top elevation of another embodiment of the resilient pinion gear;

FIGURE 7 is a side elevation, partially cross sectional, of a rigid pinion gear having resilient teeth;

FIGURE 8 is a cross sectional view of the pinion gear shown in FIGURE 7 in the direction of view arrows 8—8; and FIGURE 9 is a side cross sectional view of a speed reducer embodying the invention.

DESCRIPTION OF THE PREFERRED EMBODIMENTS

The embodiment of the rotary switching mechanism 10 shown in FIGURES 1 and 2 includes a hub 20 having an integral ring gear 22, a second rotatable ring gear 24, a rotary pinion drive 26 having an integral eccentric cam 28, and a resilient pinion gear 30. The hub 20 includes a sleeve portion 32 which is received on the shaft 34 and secured in position by pins or dowels 36. The sleeve portion terminates in stepped ends 38 which extend above and below the axis of the sleeve portion, at opposite ends, to receive the dowels and retain the sleeve in position. The dowels are received in holes provided in the shaft, not shown, and provide accurate location for the sleeve portion relative to the axis of the shaft, and permit removal of the rotary switch mechanism as required. It will be understood, however, that other securement means may be utilized as desired. The hub also includes a radial extending gear portion 40 terminating in an integral ring gear 22 having internal teeth 42.

The second ring gear 24 includes an annular bearing portion 44, which is rotatably received over the circular outer periphery of the first ring gear 22 and an annular step portion 46 defined in the radial projection 48 of the pinion drive. A radial flange 50 of the second ring gear is received between the first ring gear and the pinion drive having internal gear teeth 52 substantially co-axial with the internal teeth 42 of the first ring gear. The second ring gear also includes an external actuating cam portion 54, best shown in FIGURE 2, adapted to engage an electrical contact switch, as described hereinbelow.

The pinion drive 26 is rotatably received over the sleeve portion 32 of the hub, and is secured in place by a conventional retaining ring or clip 56, or the like. The clip in this embodiment includes a plurality of radially inwardly extending gripping fingers 58 which bite into the sleeve portion of the hub and tension the pinion drive against the gear portion 40 of the hub. The cam portion 28 in this embodiment of my invention is a circular cam eccentrically mounted relative to the axis of the pinion drive and the ring gears 22 and 24. The radial projection 48 of the pinion drive terminates in a finger adjustment 60 which extends radially beyond the bearing portion 40 of the second ring gear to permit rotation of the pinion drive by hand. The finger adjustment 60 in this embodiment is provided with teeth 62 to aid in the adjustment, however other adjustment means, including automatic adjustment, may also be provided.

The resilient pinion gear 30 is rotatably received on the cam portion 28 of the pinion drive to define an epicycloid path within the ring gears. The pinion gear has resilient external teeth of a tooth width sufficient to mesh with the internal teeth of both the ring gears 22 and 24. Rotation of the eccentric cam 28 of the pinion drive therefore urges the teeth of the pinion gears into intermeshing engagement with the ring gears in an epicycloid path. In the preferred embodiment of the invention, the resilient annular pinion gear has an unstressed internal diameter slightly smaller than the external diameter of the circular eccentric cam 28. The pinion gear is thus stretched over the eccentric cam during assembly, creating a "hoop stress" condition in the pinion gear. The hoop stress will resist deflection of the wall of the pinion gear which might otherwise have resulted in slippage between the pinion gear and the eccentric cam. Lubricant, such as the commercially available silicone lubricants, is preferably provided between the mating surface of the pinion gear and the cam to reduce the friction therebetween. It will be understood, however, that stretching of the pinion gear over the cam will not be required where the material used for the pinion gear is sufficiently rigid to prevent deflection of the wall. Deflection of the wall may also be prevented by providing a rigid rim for the pinion gear with resilient teeth, as described hereinbelow.

The ring gears in this embodiment have a different number of teeth, and the first ring gear 22 is stationary with respect to the hub 20. Rotation of the pinion drive with respect to the hub will therefore cause the second ring gear and the pinion gear to rotate in opposite directions relative to the stationary first ring gear. The direction of rotation will depend upon the number of teeth in the gears. For example, the first ring gear 22 in the disclosed embodiment has thirty-five gear teeth, the second ring gear 24 has thirty-six gear teeth, and the pinion gear has thirty-four teeth. The second ring gear will therefore rotate the thickness of one tooth of the first ring gear for each revolution of the eccentric cam 28 of the pinion drive, and the pinion gear will rotate one tooth thickness in the opposite direction. Because the second ring gear has a greater number of teeth than the first ring gear, the second ring gear will rotate in the direction of rotation of the pinion drive. If the relative number of teeth were reversed, however, the second ring gear would rotate in the opposite direction. Further, if the difference between the number of teeth between the ring gears is greater than one, the second ring gear and the pinion gear would rotate at a corresponding greater number of tooth thicknesses. The operation of the gearing system will be explained further in the description of FIGURE 3.

In the preferred embodiment of the gearing system of this invention, one of the opposed gear members has resilient teeth, and has a gear tooth thickness greater than the tooth space of the opposed meshing gear at corresponding diameters. In this embodiment of a rotary switch mechanism, the teeth 64 of the pinion gear are resilient, and the tooth thickness, as shown in FIGURE 2, is greater than the tooth space in the opposed ring gears 22 and 24. The teeth of the ring gears are therefore preferably relatively rigid. It will be understood, however, that the teeth 42 or 52 of the ring gears could alternatively be resilient and have the greater tooth thickness; in which case the pinion gear teeth would preferably be relatively rigid. The gear teeth 64 of the pinion gear in this embodiment are generally circular in cross section, and the ring gears have a sawtooth configuration. The thickness of the pinion gear teeth is therefore greatest substantially at the pitch diameter of the pinion gear, and the meshing engagement between the gears will cause the resilient teeth of the pinion gear to deform in the tooth space between the gears, as shown in FIGURE 3.

The first ring gear 22 has less teeth than the second ring gear 24, and therefore the tooth thickness A of the teeth 42 of the first ring gear will be greater than the tooth thickness B of the teeth 52 of the second ring gear, as shown in FIGURE 3, because the pitch diameters of the gears are the same. The eccentric cam urges the resilient teeth 64 of the pinion gear into intermeshing engagement with the teeth of the ring gears, causing the teeth of the ring gears to align opposite the point C on the eccentric cam furthest from the axis of the ring gears; see FIGURE 2. Line D in FIGURE 3 is a radial extension of the point C in FIGURE 2, and is referred to herein as the axis of the eccentric cam. Rotation of the eccentric cam will thus cause succeeding teeth of the ring gears to align in the axis of the eccentric cam, resulting in rotation of the second ring gear and the pinion gear as described above.

FIGURE 3 also illustrates the resilient deformation of the pinion gear teeth 64. The relaxed or unstressed configuration of the pinion gear teeth is indicated in phantom at $64^1$, and dimension E represents the tooth thickness of the pinion gear. It can be seen from FIGURE 3 that the tooth thickness of the pinion gear exceeds the thickness of the teeth of the ring gears at diameters greater than the point of intersection of the unstressed pinion gear teeth $64^1$ and the teeth of the ring gears, designated as point F in FIGURE 3. The teeth of the pinion gear are thereby resiliently deformed into the space between the teeth of the ring gears, providing full flank contact on opposite sides of the space between the teeth of the ring gears, as shown. This results in "zero backlash" condition, which is an important object of this invention. Further, the teeth of the pinion gear are resiliently deformed in the space between the teeth of the ring gears on opposite sides of the axis of the eccentric cam D. The flanks of the resilient teeth of the pinion gear will be unevenly deformed on opposite sides of the axis of the eccentric cam D, however the circular configuration of the resilient teeth assures full flank engagement.

It will be understood that various configurations may be utilized for the gear teeth, provided the resilient teeth have a greater tooth thickness at corresponding diameters than the relatively rigid teeth. I have found, however, that the circular tooth configuration for the resilient teeth provides excellent results over a considerable range of tolerances, and is therefore considered the preferred embodiment of the invention. Other tooth configurations may however be preferred in certain other applications, as in continuously operating gearing systems which impose a greater stress on the resilient teeth.

FIGURE 4 illustrates another embodiment of the rotary switching mechanism of the invention having two independently adjustable switch actuating cams 154 and 254. The rotary switching mechanism 110 includes a hub 120 having two integral ring gears 122 and 222, two independently rotatable ring gears 124 and 224, two rotary pinion drives 126 and 226 each having an integral eccentric cam 128 and 228 respectively, and two resilient pinion gears 130 and 230. The sleeve portion 132 of the hub is secured in position on the shaft 134 by dowels 136, as described hereinabove.

The radially extending gearing portion 140 of the hub of this embodiment includes two opposed integral ring gears 122 and 222 having internal teeth 142 and 242, respectively, to provide two independent rotary switch mechanisms which are substantially the mirror image of one another. The details of the cam switching elements of this embodiment of the invention may therefore be similar to the structure described in regard to FIGURES 1 to 3, and the elements have been numbered in the same sequence. Rotation of either pinion drive with respect to the hub 120 will resiliently bias the corresponding pinion gear into meshing engagement with the corresponding ring gears, causing rotation of the corresponding rotatable ring gear and the integral actuating cam 154 or 254. The closely associated actuated cams are intended to be contacted by a single switching mechanism, as shown in FIGURE 5 and described in the above referenced United States Patent No. 3,120,595.

FIGURE 5 illustrates a switching system adapted for controlling a number of timed sequences in a machine or the like. Contact switches 70, of a suitable conventional design, are suitably mounted on brackets or the like, not shown. Each switch 70 has a projecting actuating arm 72 with a roller 74 rotatably mounted on the end of the actuating arm. The switches 70 are illustrated schematically because they may be of any desirable type; that is, they may be normally open or normally closed switches, and may be connected in suitable fashion in an electrical circuit via terminals, not shown. Further, other devices such as linear transformers, valves, proximity switches, or the like, could be actuated in lieu of the switches shown in the drawings. And, the number of switches employed will depend upon the particular use to which the device is to be put.

As stated hereinabove, the actuating cams 154 and 254 are positioned closely adjacent to each other to actuate one contact switch 70. Each actuating cam, however, is independently adjustable relative to the shaft to provide an almost infinite number of variances in both the time and duration of the contact switch actuation, as more fully described in the above referenced U.S. Patent No. 3,120,595. When the actuating cams of a rotary switching mechanism 110 are positioned in register with each other, as shown by the middle switching mechanism of FIGURE 5, the switch 70 would be actuated for only one-half the cycle of the actuating cam. The configuration of the actuating cam is shown in FIGURE 2. By rotating one of the actuating cams relative to the other, the dwell of the switch can be increased to nearly a full cycle.

FIGURE 6 illustrates an embodiment of the pinion gear 80 wherein each of the resilient teeth 82 are provided with an aperture 84. The apertures provide a relief for the resilient deformation caused when the teeth are biased into meshing engagement with the relatively rigid ring gears. The aperture 84 reduce heating of the pinion gear 80 during meshing engagement of the gears. The shape and configuration of the apertures in the teeth may however be varied as required by the stress on the resilient gear.

FIGURES 7 and 8 illustrate another embodiment of the pinion gear wherein the resilient teeth 86 are independently formed and secured to the rim. The rim 88, which in this embodiment is rigid, is provided with a series of slits 90 which receive the stem portion 92 of the resilient teeth. The end 94 of the stem is enlarged to prevent withdrawal of the teeth from the rim. The rim 88 may be a metal ring which prevents deflection of the wall of the pinion gear during meshing engagement with the ring gears. As stated hereinabove, deflection of the wall of the pinion gear in an orbital or epicycloid gear chain may result in slippage of the pinion gear on the eccentric cam. Another advantage of the pinion gear shown in FIGURES 7 and 8 is that the resilient teeth of this embodiment may be replaced as required, without requiring replacement of the entire gear. This advantage may be particularly important in large, and therefore expensive gearing systems, or where the gearing cycle is continuously repeated.

FIGURE 9 illustrates a speed reducer utilizing the gearing system of the invention. The shaft 334 may be both the input of the speed reducer of the invention, and the output of a power source, such as a conventional electric motor. An eccentric cam 328 is mounted in fixed relation on the end of the input shaft. The cam may be an eccentric circular cam, as shown in FIGURES 1 to 5, and receives an annular pinion gear 330. The pinion gear of this embodiment of the invention may be resilient and provided with generally circular teeth 364, as described above. The first ring gear 322 has internal teeth and is integral with the housing 300. The second rotatable ring gear 324 is provided with internal teeth 352 which are substantially co-axial with the teeth of the first ring gear. The housing 300 of this embodiment of the speed reducer may also be the housing for the motor or power source, not shown, and the shaft 334 is suitably journaled in the housing for rotating support. The second ring gear 324 is the output of the speed reducer, and may be connected to an output shaft 302 which is substantially co-axial with the input shaft 334. The second ring gear is bearingly supported within the housing, and the output shaft is provided with a suitable keyway 304 and key 306 to prevent relative rotation between the members.

The ring gears 322 and 324 are provided with a different number of teeth to cause rotation of the second ring gear and output shaft, as described hereinabove. Rotation of the input shaft therefore causes the resilient pinion gear to mesh with the ring gears in an epicycloid or orbital path. The meshing engagement causes resilient deformation, as described hereinabove. The function and operation of the speed reducer of this embodiment is therefore substantially identical to the rotary switching mechanism described hereinabove, and the elements have been numbered in sequence to permit reference to the description given previously.

It will be understood by those skilled in the art that various materials may be utilized for the elements of the gearing system of this invention. For example, in the rotary switching mechanism of FIGURES 1 to 5, the resilient pinion gear may be formed of a urethane elastomer, such as Texin, distributed by Mobay Chemical Company. The remainder of the rotary switching mechanism may be formed from relatively rigid plastics, preferably friction resistant plastics such as acetal resins. Suitable materials include nylon and Delrin distributed by E. I. du Pont de Nemours and Company. The speed reducer shown in FIGURE 9 may preferably be formed of metal, except for the resilient pinion gear 330 which may be formed of a urethane elastomer such as described above.

What is claimed is:
1. A gearing system, comprising: a first gear having internal teeth, and a second gear received within said first gear having external teeth meshing with the teeth of the first gear at at least one point, the teeth of one of said gears being resilient and having a tooth thickness greater than the width of the space between the teeth of the opposite gear at corresponding diameters, and the teeth of the opposite gear being relatively rigid, said resilient teeth compressed into the space between the relatively rigid teeth of said opposite gear and elastically deformed radially therein to substantially completely fill said space and conform to the contour of the teeth at the meshing position of the gears, thereby substantially eliminating backlash between the gears.

2. The gearing system of claim 1, characterized in that said second gear is a resilient annular pinion gear which is stretched over a rotatable cam means to prevent deflection of the wall of the second gear at the point of intermeshing of said gears.

3. The gearing system of claim 2, characterized in that said cam means is an eccentrically mounted circular cam defining an epicycloid path within the second gear.

4. The gearing system as defined in claim 1, characterized in that said resilient teeth are generally circular in cross section having their maximum tooth thickness substantially at the pitch diameter of the gear.

5. The gearing system defined in claim 4, characterized in that the teeth of said opposite gear have a sawtooth configuration, such that said resilient generally circular teeth substantially fill the space between the teeth of said opposite gear.

6. The gearing system defined in claim 1, characterized in that said resilient teeth each have an aperture through the teeth providing a relief for the resilient deformation at the point of intermeshing between the gears.

7. A gearing system, comprising: a first gear having internal teeth, and a second gear having external teeth intermeshing with the teeth of said first gear, said second gear eccentrically mounted within said first gear to define an epicycloid path within said first gear, the teeth of one of said gears being resilient and having a generally circular cross-section with a tooth thickness greater than the width of the space between the teeth of the opposite gear at corresponding diameters, and the teeth of the opposite gear being relatively rigid, such that the resilient teeth are adapted to be resiliently deformed in the space between the teeth of the opposite gear at the point of intermeshing between the gears, thereby substantially eliminating backlash between the gears.

8. The gearing system defined in claim 7, characterized in that said second gear is resilient and said first gear is formed of a relatively rigid material.

9. The gearing system defined in claim 7, characterized in that said second gear is annular, and is received on an eccentric circular cam which biases the teeth of said second gear into the teeth of said first gear at at least one point, to substantially fill the space between the relatively rigid teeth.

10. A gearing system, comprising: a ring gear member including two substantially co-axial relatively rotatable ring gears having a different number of internal teeth, and a pinion gear member having external teeth intermeshing with a plurality of teeth of said ring gears, the teeth of one of said gear members having resilient teeth and the opposite gear member having relatively rigid teeth, and the tooth width of said resilient teeth being greater than the width of the space between the teeth of the opposite gear member at corresponding diameters, such that the resilient teeth are resiliently deformed in the space between the teeth of the opposite gear member at the position of intermeshing between the gears.

11. The gearing system defined in claim 10, characterized in that said pinion gear is formed of a resilient material and is eccentrically mounted on a circular cam means, causing said pinion gear to define an epicycloid path within said ring gear member, and at least three of said resilient teeth are deformed to substantially completely fill the space between the relatively rigid teeth of said ring gears.

12. The gearing system defined in claim 10, characterized in that the teeth of said pinion gear are generally circular in cross section, and said resilient teeth compressed into the space between the relatively rigid teeth of said ring gears and elastically deformed radially therein to substantially completely fill said space and conform to the contour of the teeth at the meshing position of the gears.

13. A gearing system, comprising: a relatively rigid ring gear having internal teeth, and annular resilient pinion gear received within said ring gear having external teeth, and rotatable cam means received within said annular pinion gear biasing the teeth of said pinion gear at at least one point, the teeth of said resilient pinion gear having a tooth thickness greater than the space between the teeth of said ring gear at corresponding diameters, such that the resilient teeth of said pinion gear are resiliently deformed in the space between the teeeth of said ring gear by the cam means at the point of intermeshing between the gears, thereby substantially eliminating backlash between the gears, and said pinion gear being stretched over said cam means to prevent slippage therebetween.

14. The gearing system defined in claim 13, characterized in that said resilient teeth are generally circular in cross section, and the pitch diameter of the gears pass substantially through the center of the circular teeth.

15. The gearing system defined in claim 13, characterized in that said rotatable cam means is an eccentrically mounted circular cam defining an epicycloid path within said ring gear, and said ring gear has different number of teeth than said pinion gear causing one of said gears to rotate at a different speed than the other gear.

16. In an adjustable actuating mechanism, comprising: a hub adapted to be mounted in fixed relation on a shaft, a first ring gear having internal teeth fixed relative to said hub, a second ring gear supported for rotation adjacent and relative to the first ring gear and having internal teeth substantially co-axially aligned with the teeth of said first gear, said second gear having a different number of teeth than said first gear and having an encircling actuating means, a pinion gear having external teeth intermeshing with the teeth of said first and second gears at at least one point, and a rotatable cam means biasing the teeth of said pinion gear into intermeshing relation with said first and second gears, the teeth of said pinion gear being resilient and of a tooth thickness greater than the space between the teeth of said ring gears at corresponding diameters, such that the resilient teeth of said pinion gear are resilienly deformed in the space between the teeth of said ring gears by the cam means at the point of intermeshing between the gears, thereby eliminating backlash and making the gears substantially self-locking.

17. The adjustable actuating mechanism in claim 16, characterized in that said second ring gear is supported for relative rotation on said first ring gear.

18. The adjustable actuating mechanism defined in claim 16, characterized in that said rotatable cam means is a circular cam received within said pinion gear and eccentrically mounted relative to said ring gears, and said cam means includes a finger adjustment means rotatable to adjust the position of the external cam surface relative to said hub.

19. The adjustable actuating mechanism defined in claim 15, characterized in that said pinion gear is annular and formed of a resilient material which is stretched over said circular eccentric cam to prevent deflection of the annular wall of said pinion gear during adjustment of the position of the actuating means.

20. The adjustable actuating mechanism defined in claim 16, characterized in that said first ring gear includes a second set of internal teeth, and said mechanism includes a third ring gear having internal teeth substantially concentric therewith, a second pinion gear having resilient external teeth intermeshing with the teeth of said third ring gear and the second set of teeth of said first ring gear, and a second rotatable cam means biasing the teeth of the second pinion gear into said intermeshing engagement, and a second external actuating means on said third ring gear independently adjustable relative to said hub to adjust the dwell of said actuating means.

21. The adjustable actuating mechanism defined in claim 20, characterized in that said resilient teeth of said pinion gears are generally circular in cross section.

22. The adjustable actuating mechanism defined in claim 21, characterized in that the teeth of said ring gears have a sawtooth configuration and the width of the space between the teeth is less than the thickness of the generally circular teeth of said pinion gears at corresponding diameters to provide full flank engagement therebetween.

23. A speed reducer, including an input shaft, an eccentric cam means fixed on said input shaft, a pinion gear member rotatably received on said cam means having external teeth, a ring gear member including a first ring gear having internal teeth intermeshing with said pinion gear at at least one point and a second rotatable ring gear having a different number of internal teeth than said first ring gear intermeshing with teeth of said pinion gear member, one of said gear members having resilient teeth and having a tooth thickness greater than the space between the teeth of the opposite gear member at corresponding diameters, said resilient teeth compressed into the space between the relatively rigid teeth of the opposite gear member and elastically deformed radially therein to substantially completely fill said space and conform to the contour of the teeth in the meshing position of the gear members.

24. The speed reducer defined in claim 23, characterized in that said pinion gear member is formed of a resilient material and the resilient teeth are resiliently deformed to intermesh with the internal teeth of both ring gears.

25. The speed reducer defined in claim 23, characterized in that said resilient teeth are generally circular in cross section.

26. The speed reducer defined in claim 23, characterized in that said first ring gear is integral with the speed reducer housing.

27. The speed reducer defined in claim 26, characterized in that said second ring gear is the ouput of the speed reducer.

References Cited

UNITED STATES PATENTS

| | | |
|---|---|---|
| 2,017,139 | 10/1935 | Wood. |
| 2,828,649 | 4/1958 | Boerdijk et al. _ _ _ _ _ _ 74—805 X |
| 3,056,315 | 10/1962 | Mros _ _ _ _ _ _ _ _ _ _ _ _ _ _ 74—805 |

FOREIGN PATENTS 182,999  7/1936  Switzerland.

LEONARD H. GERIN, Primary Examiner

U.S. Cl. X.R.

74—409, 411, 461, 462